Aug. 7, 1934.   H. HAISS   1,969,217
VULCANIZER
Filed Sept. 7, 1932   3 Sheets-Sheet 2

Inventor
Hugo Haiss

Aug. 7, 1934.   H. HAISS   1,969,217
VULCANIZER
Filed Sept. 7, 1932   3 Sheets-Sheet 3

Inventor
Hugo Haiss
By Eakin & Avery
Attys.

Patented Aug. 7, 1934

1,969,217

UNITED STATES PATENT OFFICE 1,969,217

VULCANIZER

Hugo Haiss, Alliance, Ohio, assignor to The B. F. Goodrich Company, New York, N. Y., a corporation of New York Application September 7, 1932, Serial No. 631,958

5 Claims. (Cl. 18—17)

This invention relates to vulcanizing presses and especially to presses for vulcanizing tires.

The principal objects of the invention are to provide adequate molding pressure, to reduce the time necessary for loading and unloading the press, to reduce the labor of stripping the article from the mold and to conserve floor space and energy.

Another object is to provide electric means for operating the molds and thereby to eliminate the use of hydraulic pressure and provide a self-contained molding device.

Other objects will appear from the following description and the accompanying drawings.

Figure 1:
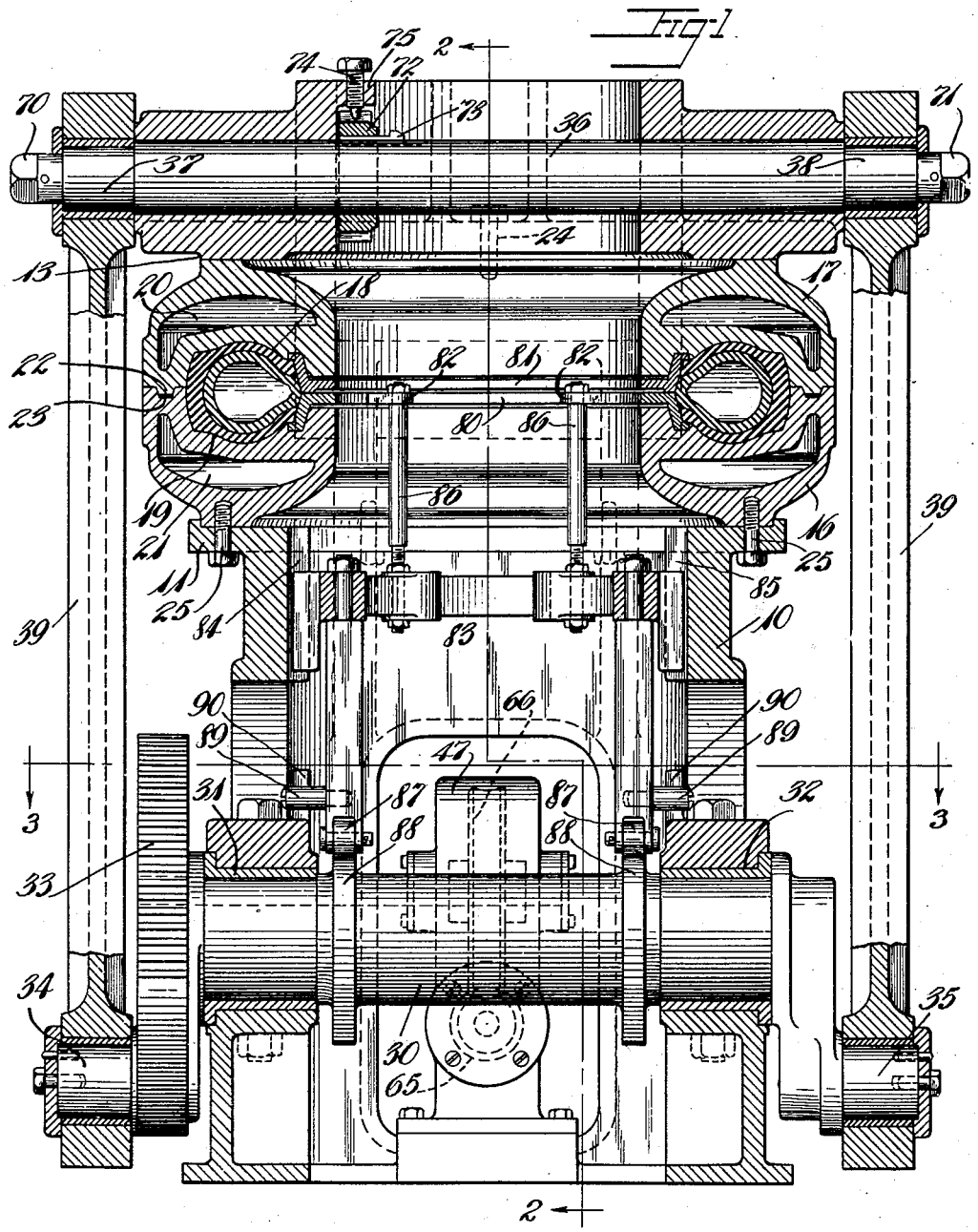
Fig. 1 is a central sectional front elevation of the device taken in the plane of the crank shaft.

Referring to the drawings, the numeral 10 designates the frame of the machine which is in the form of a hollow pedestal having a flange 11 at its top to support one of the mold members and a hinge bracket 12 to which a movable platen 13, having a cooperating hinge bracket 14, is pivotally secured by a pintle 15.

The mold comprises a pair of similar annular mold members 16 and 17 having mating cavities 18 and 19 formed to define the outer shape of a tire. Each of the mold members is provided with a steam cavity, 20 and 21, for heating the mold. One of the mold members is provided with a dowel rib 22 and the other with a mating groove 23 for insuring their proper alignment. Mold member 17 is secured by bolts 24 to the movable platen 13 and mold member 16 is secured by bolts 25 to the flange 11 of the stationary frame.

A steam pipe 26, from a steam supply (not shown), and a drain pipe 27 are provided for supplying steam and removing condensed water from the cavity 21. Supply of steam and return of condensed water are similarly provided for the cavity 20 by flexible tubes 28 and 29 which permit opening and closing of the mold.

Figure 2:
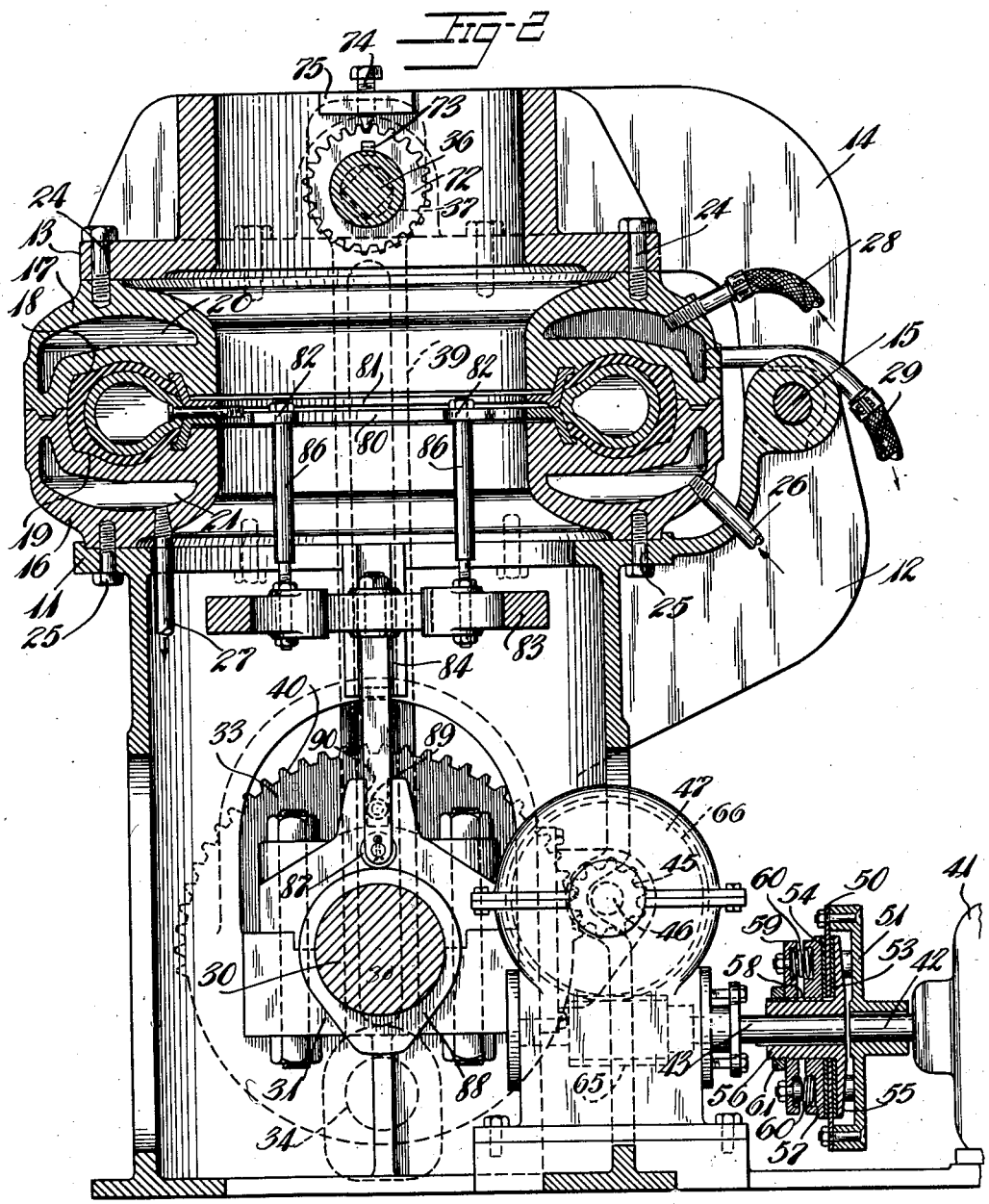
Fig. 2 is a side elevation in section taken on line 2—2 of Fig. 1.
Figure 3:
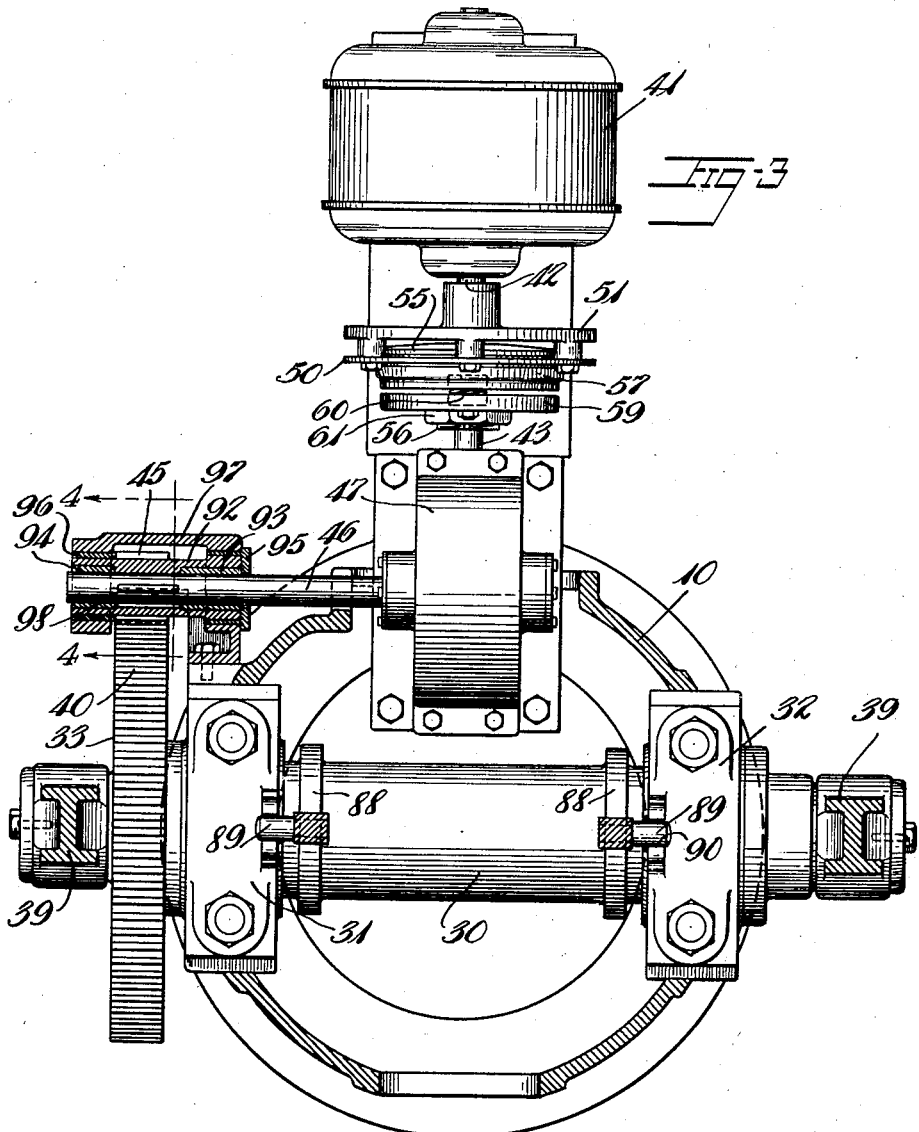
Fig. 3 is a sectional plan taken on line 3—3 of Fig. 1.
Figure 4:
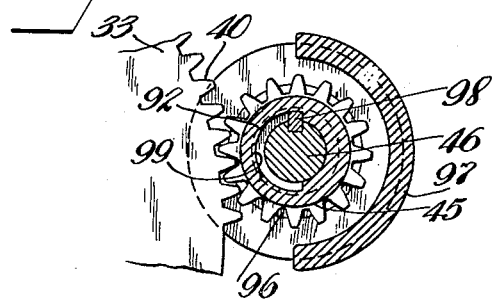
Fig. 4 is a detail sectional view taken on line 4—4 of Fig. 3.

A crank shaft 30 is rotatably mounted in horizontal bearings 31 and 32 seated in the walls of frame 10 and has a segmental gear wheel 33 mounted thereon. A wrist pin 34, eccentrically mounted with respect to the shaft 30 on the outer face of the gear 33, is provided in alignment with a similar wrist pin 35 on the opposite end of the shaft. A shaft 36 extends horizontally through bearings in the platen 13 in parallelism with the shaft 30 and pintle 15. Shaft 36 is provided with aligned eccentric ends 37 and 38. A connecting rod 39 pivotally engages at one end the eccentric portion 37 and at its other end wrist pin 34. A similar connecting rod pivotally engages eccentric portion 38 at one end and wrist pin 35 at the other. The arrangement is such that when shaft 30 is rotated through half of a revolution from the position illustrated in Fig. 2, in a clockwise direction, platen 13 will be raised a sufficient distance to permit removal of the tire. Gear 33 is provided with teeth 40 throughout half of its circumference, the remainder of its circumference being relieved to the radius of the roots of the teeth.

An electric motor 41 adapted to provide the necessary power is mounted on frame 10 with its shaft 42 in alignment with a shaft 43 which has a worm 65 mounted thereon in position to engage a worm wheel 66 fixed on a shaft 46 within a casing 47. A pinion 45 also mounted on shaft 48 in a manner hereinafter described engages gear 33 in driving relation thereto. An annular friction disc 50 mounted on a supporting flange 51, which in turn is secured to motor shaft 42, is engaged by annular rings of brake lining or other frictional material 53 and 54. Ring 53 is mounted on the flange 55 of a collar 56 secured to shaft 43. Friction ring 54 is secured to a ring 57 slidably mounted on collar 56 and prevented from rotating thereon by a feather key 58. A flange 59 secured to collar 56 carries a plurality of compression coil springs 50 which impinge against ring 57 and hold the friction rings 53 and 54 in engagement with ring 60, the arrangement being such that shaft 42 frictionally drives shaft 43 and slippage takes place between rings 53 and 54 and ring 60 when the resistance to the turning of shaft 43 becomes more than a determined amount. Disc 59 is slidable on collar 56 and engages feather key 58. A threaded collar 61 engaging threads on collar 56 may be adjusted to increase or decrease the tension on springs 60.

Pinion 45 is not fixed to shaft 46 but is formed integral with a quill 92 having bushings 93 and 94 which rotatably engage shaft 46 at each side of pinion 45. The outer surfaces of the ends of the quill are rotatably engaged by bushings 95 and 96 fixed in a bracket 97 attached to the frame 10 of the machine. A key 98 is rigidly mounted in shaft 46. A recess 99 is provided in pinion 45 of such a depth as to clear the key and of such angular extent as to permit free rotation of pinion 45 on shaft 46 through an angle of 180 degrees, the arrangement being such that when shaft 46 is rotated in one direction the rotation may be reversed and rotation continued through 180 degrees before pinion 45 is driven thereby and upon further rotation of shaft 46 pinion 45 will be rotated therewith.

In order to provide adjustment of the mold space between platen 13 and flange 11, shaft 36 is provided with extending squared ends 70 and 71 whereby it may be turned by means of a wrench. A pinion 72 is fixed to shaft 36 by a key 73. A set screw 74, having a point adapted to engage between any two teeth of pinion 72, is threaded through a lug 75 formed on platen 13 and serves to lock shaft 36 to the platen in a plurality of adjustments. A bead-engaging ring 80 is loosely seated in mold cavity 19 and a similar ring 81 is seated in cavity 18. These rings complete the tire forming cavity. Ring 80 is provided with inwardly extending lugs 82. A cross-head 83 is vertically movable on guideways 84 and 85 formed on frame 10. Push rods 86 connect lugs 82 of ring 80 to cross-head 83, the rods being threaded and provided with spaced nuts for adjustably engaging the cross-head. A pair of rollers 87, mounted on cross-head 83, ride on cams 88 provided on crank-shaft 30. Guide pins 89 mounted on cross-head 83 near the rollers slidably engage in slots 90 formed on the caps of the crank bearings 31 and 32. Cams 88 are of such shape that when the upper platen 13 is raised by the crank shaft 30, ring 80 will be lifted from its seat to strip the tire from the lower mold half.

In the operation of the device, the molds 16 and 17 of the desired size and design are placed in position and fastened in place. Rods 86 are adjusted to properly seat the mold ring 80. Mold ring 81 is placed in position and platen 13 is lowered by applying power from motor 41. Shaft 36 is then rotatably adjusted to such a position as to just prevent the crank shaft 30 passing dead center and the shaft 36 is then locked in place by the set screw 74. The platen 13 is raised by reversing the motor 41.

The device is now ready for use. Steam is admitted to the cavities 20 and 21 and a tire with its enclosed air or water bag is placed in molding position. The motor 41 is started and the platen 13 lowered. As gear 33 only permits its being driven through an arc of 180 degrees, further rotation of shaft 46 would disengage the pinion 45 from the gear 33 leaving the cranks 34 and 35 on dead center and the press closed. The platen 13 however is normally so adjusted that the load is so increased just before dead center position is reached that slippage of the driving disc 50 takes place before disengagement of the gears occurs. The current to motor 41 is then shut off. This of course may be done automatically if desired by including an overload circuit breaker in the motor circuit.

When the cure is completed the motor 41 is started in the opposite direction, causing shaft 46 to rotate in the opposite direction. The key 98 rotates through 180 degrees before picking up pinion 45, and as this permits the motor shaft to make a number of revolutions before the load is picked up, due to the reducing gear, the starting load on the motor is at a minimum.

I claim:

1. A molding press for vulcanizing tires, said press comprising a stationary mold member, a movable mold member hinged to cooperate therewith to define a mold cavity, a power driven shaft, means operable thereby to control the opening and closing movements of the movable mold member, means for driving said shaft including a pinion and a mutilated gear, and a constantly engaged friction coupling located between said shaft and the source of power to permit slippage between said shaft and the source of power after the mold has been completely closed.

2. A molding press comprising a stationary mold member, a movable mold member hinged to cooperate therewith, a crank shaft rotatably mounted on the stationary member, a link connecting said crank shaft to the movable member whereby the press may be opened and closed, and means for driving said shaft, said means comprising a mutilated gear and a pinion mounted for cooperation with the toothed portion thereof.

3. A molding press comprising a stationary mold member, a movable mold member hinged to cooperate therewith, a crank shaft rotatably mounted on the stationary member, a link connecting said crank shaft to the movable member whereby the press may be opened and closed and means including a reversible motor and a mutilated gear and pinion for driving said crank shaft, said pinion being connected to its driving shaft by a lost motion device whereby the load on the motor is temporarily relieved during reversal of direction of movement.

4. A molding press comprising a stationary mold member, a movable mold member hinged for cooperation therewith, a crank-shaft rotatably mounted on said stationary member, a link for connecting said crank shaft to said movable member, means including a mutilated gear and pinion for driving said crank shaft in either direction, and means for so adjusting the limits of travel of said movable member as to prevent overtravel of the crank during the closing movement.

5. A molding press comprising a stationary mold member, a movable mold member hinged for cooperation therewith, a crank shaft rotatably mounted in said movable member, a pair of connecting rods for connecting said crank shaft to said movable member, means for preventing rotation of said crank shaft beyond dead center, and means for driving said crank shaft, said means including a friction drive member set to slip at a predetermined overload and a mutilated gear and pinion.

HUGO HAISS.